June 20, 1950 L. W. T. CUMMINGS 2,512,562
CATALYTIC REACTION APPARATUS
Filed Oct. 13, 1947
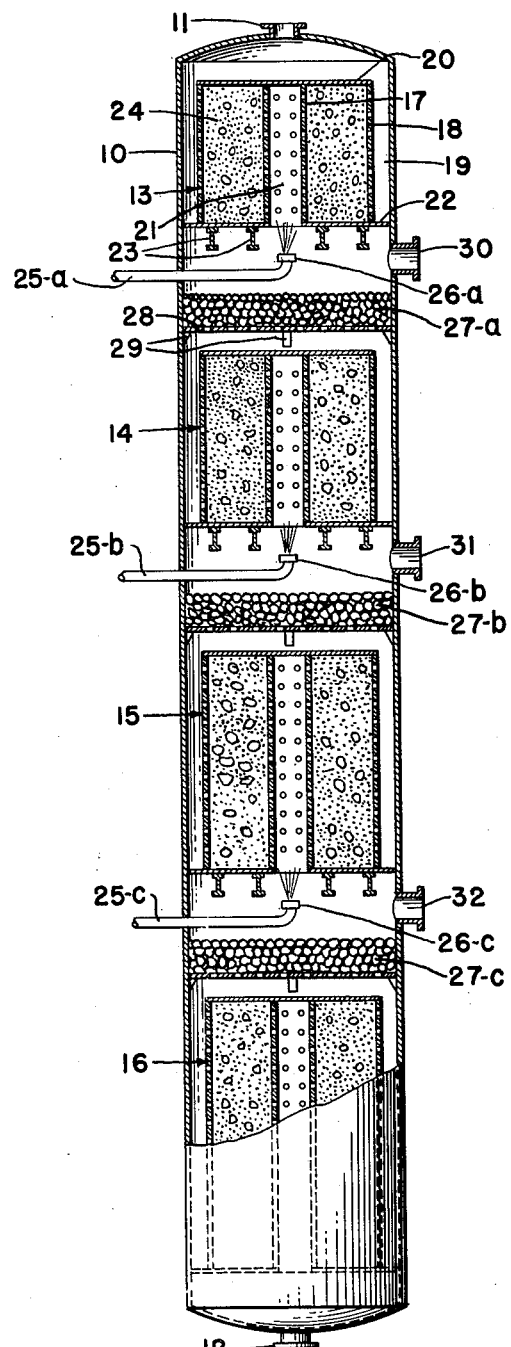
INVENTOR.
LELAND W. T. CUMMINGS
BY Busser and Harding
ATTORNEYS Patented June 20, 1950

2,512,562

UNITED STATES PATENT OFFICE 2,512,562

CATALYTIC REACTION APPARATUS

Leland W. T. Cummings, Wyncote, Pa., assignor to Sun Oil Company, Philadelphia, Pa., a corporation of New Jersey Application October 13, 1947, Serial No. 779,557

8 Claims. (Cl. 23—288)

This invention relates to improved apparatus for conducting catalytic reactions and more particularly to apparatus for carrying out catalytic processes involving alternate endothermic and exothermic reactions. A typical process of this type is the catalytic conversion of hydrocarbons in a cyclic operation, wherein hydrocarbons are caused to react endothermically in the presence of a catalytic contact mass, causing deposition of carbonaceous deposits on the mass which reduce the catalytic activity, and the catalyst is then reactivated by burning off the carbonaceous material. The catalytic cracking of higher boiling hydrocarbons to lower boiling hydrocarbons is a specific example of this type of process. Other examples are reforming, dehydrogenation and the like.

More specifically, the present invention is concerned with an improved catalytic reactor for use in a stationary bed type of operation, wherein the catalyst is employed in the form of a plurality of stationary beds within the reactor and is regenerated periodically in situ by passing hot oxygen-containing gases through the several beds. The reactor is especially adapted for use in that type of catalytic conversion generally referred to in the art as adiabatic operation. By this is meant that both the endothermic and exothermic reactions are carried out without the use of a circulating convective fluid for supplying heat to, or removing heat from, the reaction zone by indirect heat transfer. In other words, in such adiabatic operation the heat required for the endothermic reaction is supplied either as sensible heat of the reactants entering the reaction zone or as heat stored in the contact mass during the previous regeneration period, while the heat evolved during the exothermic reaction either is stored in the contact mass for use in the subsequent on-stream period or else is removed from the reaction zone in the form of sensible heat of the effluent regeneration gases. The reaction apparatus according to the present invention is especially adapted for storage within the contact mass of a large proportion of the exothermic heat evolved during the regeneration period for use during the subsequent on-stream period. A feature of the invention permits the utilization of this stored heat not only as heat of reaction but also as heat for evaporating hydrocarbon charge material within the reactor itself.

The features and advantages of the invention can best be understood by reference to the accompanying drawing, which represents a cross sectional elevation of the improved catalytic reaction vessel. It will be understood that the drawing is merely illustrative of one specific embodiment and that numerous specific modifications thereof may be made within the scope of the invention.

Referring to the drawing, the reactor comprises an elongated cylindrical outer shell 10 having an inlet connection or nozzle 11 at its top and an outlet connection or nozzle 12 at the bottom. A plurality of superposed trays are provided within the shell for maintaining several separate beds of catalytic contact material. For purpose of illustration, the reactor is shown in the drawing as having four such beds, indicated generally as 13, 14, 15 and 16, but it will be understood that any suitable or desired number of beds may be provided. The trays are annular-shaped and are positioned concentric to the outer shell 10 and in spaced apart relation to each other. Each of the trays may comprise an inner wall 17 which is continually perforated to permit flow of fluid therethrough, and an outer wall 18, likewise perforated, which is of lesser diameter than the shell 10 so as to provide an annular space 19 between the outer wall 18 and the shell. At the top of each tray is an imperforate top member 20 which extends radially to the outer wall 18 and which covers the top of each bed and closes off the inner space 21 at its top. Each tray has an imperforate support plate 22 which extends radially from the inner wall 17 to the shell 10, thereby functioning as a bottom for the tray and also serving to close off the outer annular space 19 at its bottom. The trays may be supported within the shell 10 in any suitable manner, such as by means of support beams 23 which extend across the shell and are suitably fastened thereto.

The trays are filled with a granular contact material 24 which preferably is a mixture of catalyst (for example, a silica-alumina type catalyst if the reaction to be conducted is the cracking of hydrocarbons) and a granular inert material of high heat absorbing capacity (for example, artificially fused oxide such as described in Houdry Patent No. 2,414,812). The proportion of catalyst to heat absorbing material may vary widely depending upon the particular materials used and the amount of heat that it is desired to store in the contact mass during each cycle, but generally will be within the range of 1:5 to 3:1. With the tray construction as above described and with the general direction of reactant flow from top to bottom of the reactor, it will be apparent that the flow of reactants through each bed will be in a generally horizontal direction inwardly. Thus, reactants will enter each bed from the outer annular space 19 through the perforations in outer wall 18 and will leave each bed by issuing through the perforations in inner wall 17 into the inner space 21, thence flowing to the next lower bed and passing therethrough in like manner.

It is distinctly preferable that each of the walls, 17 and 18, be so designed with respect to the number and size of perforations that the pressure drop across each wall during regeneration will be within the range of 0.2 to 1.0 lb./sq. in. and preferably of the order of 0.5 lb./sq. in. This will insure good distribution of regenerating gas flowing through the contact mass and will minimize by-passing in case of shrinkage of the contact mass within the tray. Such shrinkage has been found to occur almost invariably upon prolonged operation, and consequently it is of great importance that the inner and outer walls of the trays be properly orificed to give the desired pressure drop as above specified for the regeneration period. This will also insure satisfactory distribution of reactants during the on-stream period.

In the space between adjacent beds of catalytic contact material, means are provided for introducing additional amounts of reactants in the form of a fine spray. Such means may comprise inlet lines 25—a, 25—b and 25—c having liquid spray nozzles 26—a, 26—b and 26—c preferably pointing upwardly toward the central space within the tray next above. Below each spray nozzle but spaced above the next lower bed of catalytic contact material is a relatively shallow bed of inert contact mass adapted to provide a relatively large surface area for evaporation of the liquid reactants. These evaporating beds, illustarted in the drawing as 27—a, 27—b and 27—c, may be supported by means of a continuous perforate support plate 28 which rests on support members 29 attached to the outer shell 10. The contact mass may be any inert material suitable for providing a relatively large surface area per unit volume and, if desired, may be the same material as that used as the heat absorbing material in admixture with the catalyst in beds 13, 14, 15 and 16.

The purpose of the beds of inert contact mass is to insure evaporation of liquid reactants injected through lines 25—a, 25—b and 25—c before such reactants reach the catalyst beds, in order to prevent or minimize uneven deposition of carbonaceous matter on the catalytic contact mass which deposition might cause abnormally high local temperatures in the catalytic mass during regeneration. The evaporating beds also serve to retain thereon any introduced hydrocarbons which are sufficiently high boiling as not to be vaporizable under the conditions prevailing within the reactor. These high boiling materials will undergo thermal decomposition within the evaporating beds, thereby forming carbonaceous deposits therein. During subsequent regeneration of the catalyst, these deposits also will burn and liberate heat which will help maintain the temperature of the evaporating beds at the desired level throughout the cyclic operation.

It will be noted that the catalyst beds 13, 14, 15 and 16 are of varying height, increasing in the direction from top to bottom of the reactor. This is distinctly preferable in order to compensate for the additional reactants supplied through lines 25—a, 25—b and 25—c so that the space velocities of reactants passing through the several catalyst beds will be about the same. In operation, during the on-stream or endothermic reaction period, hydrocarbon reactants are introduced into the reactor at inlet 11 and pass into and inwardly through the uppermost catalyst bed 13 and into the inner space 21. In passing through bed 13 the reactants will absorb heat from the contact material 24 in excess of that necessary for the endothermic conversion reaction and accordingly the hydrocarbons flowing into inner space 21 will be at a higher temperature than the reactants entering bed 13. The temperature will also be higher at this point than desired for reaction in the next lower catalytic bed. This excess heat in the reactants from bed 13 is utilized to vaporize the liquid reactants injected through line 25—a and spray nozzle 26—a so that the temperature of the mixture passing to bed 14 will be at the desired value. The mixture of reactants then passes through bed 14 where heat is again picked up in excess of that necessary for maintaining the catalytic conversion reaction, and after passing through the bed commingles with the next liquid spray introduced through line 25—b and spray nozzle 26—c, the amount of liquid reactants injected at this point being sufficient to reduce the temperature of the mixture passing to bed 15 to the desired value. The reaction mixture then flows through bed 15 where absorption of heat is again in excess of that necessary for the reaction, and the resulting reactants are again cooled after leaving bed 15 by admixture with a third liquid spray introduced through line 25—c and spray nozzle 26—a before passing to catalytic bed 16, etc.

By way of example, in the catalytic cracking of hydrocarbons the reactants flowing to bed 13 may have a temperature of say 800–900° F.; whereas the hydrocarbons issuing from bed 13 into inner space 21 may have a temperature of 1000–1100° F. Sufficient liquid reactants, at a temperature of 200–600° F., may be introduced as quenching material through spray nozzle 26—a to cause the resulting vapor mixture passing to bed 14 to have a temperature of 800–900° F. Upon passing through bed 14, the mixture will absorb sufficient heat to reach a temperature again of 1000–1100° F. Similar fluctuations in temperature will occur as the reactants pass downwardly through the reactor and alternately come in contact with the spray streams and the other catalytic contact masses.

Regeneration of the contact mass is effected by blowing an oxygen-containing gas such as air through the beds. This may be done by passing the regenerated gas through the several beds in series. This method of regeneration, however, may entail certain disadvantages. A possible disadvantage is that upon completing the regeneration in this manner the beds may be left at different temperatures, the first bed tending to have a temperature about the same as that of the entering regeneration gas whereas the last bed may be at a considerably higher temperature. When this condition occurs, there will be a tendency during the subsequent on-stream operation to deposit a greater amount of carbonaceous material in the bed or beds having the higher temperature. Then, upon further regeneration, the temperature of these beds may become even higher than during the previous regeneration. Thus, it is possible that regeneration in series may result in overheating of certain beds. A still further disadvantage of this type of regeneration is that it necessitates a high pressure drop through the reactor.

In order to permit the regeneration to be carried out in improved manner, the reactor is provided with side inlet or outlet means between the beds, illustrated in the drawing as flanged nozzles 30, 31 and 32. Nozzles 30 and 32 serve as inlets for the regenerating gas whereas nozzle 31 serves as an outlet for the combustion gases. During regeneration, regenerating gas enters through inlet nozzle 30 into the space between beds 13 and 14 and thence flows in two directions. One portion flows through bed 13 and out of the reactor at the top through nozzle 11. The rest of the regenerating gas passes downwardly through bed 14 and out of the reactor through nozzle 31. In view of the construction of the beds, the flow of regenerating gas therethrough is automatically maintained at the same space velocities and no additional means is needed for regulating the relative rates of flow to the individual beds. Regenerating gas is likewise introduced through nozzle 32 into the space between beds 15 and 16, whence part of it flows through bed 15 and out of the reactor through nozzle 31 while the rest passes downwardly through bed 16 and out through nozle 12. By operating in this manner, each bed is regenerated by a separate stream of the regenerating gas, with the result that the temperature of the beds at the end of the regeneration period is more nearly uniform and the pressure drop through the reactor during regeneration is greatly reduced.

It will be understood that in the above description various details of construction representing good engineering practice have been omitted, since they will be readily apparent to one skilled in the art. For instance, it is apparent that suitable manholes should be provided for access to the inside of the reactor and that means should be provided for filling and emptying the trays with contact materials. Likewise, suitable insulating means should be included.

Having described my invention, what I claim and desire to protect by Letters Patent is:

1. A catalytic reactor for conducting alternate endothermic and exothermic reactions which comprises a vertically elongated outer shell having an inlet at the top and an outlet at the bottom, a plurality of annular-shaped trays superposed within said shell essentially concentric thereto and in spaced apart relation to each other and adapted to retain therein a bed of granular contact material, each of said trays comprising an outer perforate wall of lesser diameter than said shell so as to provide an annular space therebetween and an inner perforate wall defining the inner space of said tray, an imperforate top member for each tray extending radially to said outer perforate wall and closing off said inner space at its top, an imperforate bottom member for each tray extending radially from said inner perforate wall to said outer shell and closing off the annular space between the tray and the shell at its bottom, a continuous perforate support member between each two adjacent trays for supporting a relatively shallow bed of granular inert contact mass between adjacent trays in spaced apart relation thereto, and inlet spray means positioned between each of said perforate support members and the tray next thereabove for introduction of liquid reactants in the form of a fine spray above each of said beds of granular inert contact mass.

2. A catalytic reactor according to claim 1 having a conduit connecting with said outer shell between each two adjacent trays for introduction and withdrawal of fluids during the exothermic reaction period.

3. A catalytic reaction vessel according to claim 1 wherein said annular-shaped trays are of progressively increasing height in the direction from top to bottom of the reactor.

4. A catalytic reactor according to claim 3 having a conduit connecting with said outer shell between each two adjacent trays for introduction and withdrawal of fluids during the exothermic reaction period.

5. Catalytic reaction apparatus for conducting alternate endothermic and exothermic reactions which comprises an elongated outer shell having an inlet and an outlet at opposite ends, a plurality of annular-shaped trays spaced apart within said shell essentially concentric thereto and adapted to retain granular contact material, each of said trays having an outer diameter less than said shell to provide an annular space therebetween and having perforate inner and outer walls to permit fluid flow across the tray, means for closing off one end of said annular space adjacent each tray, means for closing off the opposite end of the inner space within each tray, a perforate support member between each two adjacent trays for maintaining a bed of granular inert contact material, and spray means positioned between each of said beds and the tray upstream therefrom for introduction of liquid reactants in the form of a fine spray.

6. A catalytic reactor according to claim 5 having a conduit connecting with said outer shell between each two adjacent trays for introduction and withdrawal of fluids during the exothermic reaction period.

7. A catalytic reactor according to claim 5 wherein said annular-shaped trays are of progressively increasing depth in the direction from inlet to outlet of the reactor.

8. A catalytic reactor according to claim 7 having a conduit connecting with said outer shell between each two adjacent trays for introduction and withdrawal of fluids during the exothermic reaction period.

LELAND W. T. CUMMINGS.

REFERENCES CITED

The following references are of record in the file of this patent:

UNITED STATES PATENTS

| Number | Name | Date |
| --- | --- | --- |
| 2,248,734 | Barr | July 8, 1941 |
| 2,337,419 | Sensel | Dec. 21, 1943 |
| 2,452,569 | Houdry | Nov. 2, 1948 |